US011941097B2

(12) United States Patent
Simonchik (10) Patent No.: US 11,941,097 B2
(45) Date of Patent: Mar. 26, 2024

(54) METHOD AND DEVICE FOR UNLOCKING A USER DEVICE BY VOICE

(71) Applicant: ID R&D Inc., New York, NY (US)

(72) Inventor: Konstantin Konstantinovich Simonchik, Saint Petersburg (RU)

(73) Assignee: ID R&D INC., New York, NY (US)

( * ) Notice: Subject to any disclaimer, the term of this patent is extended or adjusted under 35 U.S.C. 154(b) by 471 days.

(21) Appl. No.: 17/188,039

(22) Filed: Mar. 1, 2021

(65) Prior Publication Data

US 2022/0277062 A1 Sep. 1, 2022

(51) Int. Cl.
*G06F 21/00* (2013.01)
*G06F 21/32* (2013.01)
*G10L 17/18* (2013.01)
*G10L 17/22* (2013.01)

(52) U.S. Cl.
CPC .............. *G06F 21/32* (2013.01); *G10L 17/18* (2013.01); *G10L 17/22* (2013.01)

(58) Field of Classification Search
CPC ......... G06F 21/32; G10L 17/18; G10L 17/22; G10L 17/02; G10L 17/06; G10L 17/24
See application file for complete search history.

(56) References Cited

U.S. PATENT DOCUMENTS

| 10,255,992 | B2 | 4/2019 | Booth et al. |
| 2017/0200451 | A1* | 7/2017 | Bocklet ................. G10L 17/16 |
| 2019/0005962 | A1* | 1/2019 | Martínez González ..................... G10L 17/02 |
| 2019/0043507 | A1 | 2/2019 | Huang et al. |
| 2020/0243067 | A1* | 7/2020 | Maziewski ........... G06F 21/566 |
| 2021/0105565 | A1* | 4/2021 | Pedersen .................. G06N 3/08 |

* cited by examiner

*Primary Examiner* — Jeffrey C Pwu
*Assistant Examiner* — William A Corum, Jr.
(74) *Attorney, Agent, or Firm* — Millen, White, Zelano & Branigan P.C.; William F. Nixon (57) ABSTRACT

Methods and devices for spoofing proof authentication of a user by voice to unlock a user device. According to one of its aspects, a method includes performing spoofing proof authentication of a user by voice. According to another aspect, a device is configured for spoofing proof authentication of a user by voice. Implementation of the method provides not only personalized access to the data, but also the highest level of security due to anti-spoofing.

11 Claims, 5 Drawing Sheets

```
┌─────────────────────────────────────────────────────────────────┐
│ Receiving a signal representing an utterance of a user including a wake up │
│           phrase part and a command phrase part 110             │
└─────────────────────────────────────────────────────────────────┘
                                  ↓
┌─────────────────────────────────────────────────────────────────┐
│ Extracting, from the wake up phrase part of the signal, a first set of features │
│ and feeding said first set of features to a first pre-trained neural network and │
│ matching an obtained result from the first pre-trained neural network with a │
│ text-dependent model to assign a first matching score to the wake up phrase │
│                       part of the signal 120                    │
└─────────────────────────────────────────────────────────────────┘
                                  ↓
┌─────────────────────────────────────────────────────────────────┐
│   Extracting, from the command phrase part of the signal, a second set of │
│     features and feeding said second set of features to a second pre-trained │
│ neural network and matching an obtained result from the second pre-trained │
│ neural network with a text-independent model to assign a second matching │
│           score to the command phrase part of the signal 130    │
└─────────────────────────────────────────────────────────────────┘
                                  ↓
┌─────────────────────────────────────────────────────────────────┐
│ Computing a final matching score of the signal based on the first matching │
│                score and the second matching score 140          │
└─────────────────────────────────────────────────────────────────┘
                                  ↓
┌─────────────────────────────────────────────────────────────────┐
│    Extracting, from the signal including the wake up phrase part and the │
│ command phrase part, features and feeding said features to at least one pre- │
│ trained neural network to assign at least one confidence score to the signal │
│     including the wake up phrase part and the command phrase part and │
│   computing an anti-spoofing confidence score based on the at least one │
│                       confidence score 150                      │
└─────────────────────────────────────────────────────────────────┘
                                  ↓
┌─────────────────────────────────────────────────────────────────┐
│   Computing a final device authentication score, wherein the final device │
│ authentication score is weighted sum of a log-likelihood representation of │
│   the final matching score and a log-likelihood representation of the anti- │
│                    spoofing confidence score 160                │
└─────────────────────────────────────────────────────────────────┘
                                  ↓
┌─────────────────────────────────────────────────────────────────┐
│   Comparing the final device authentication score with a predetermined │
│                    authentication threshold 170                 │
└─────────────────────────────────────────────────────────────────┘
```

METHOD AND DEVICE FOR UNLOCKING A USER DEVICE BY VOICE

TECHNICAL FIELD OF THE INVENTION

This specification is directed to methods and devices for unlocking a user device by spoofing proof authentication of the user by voice.

DESCRIPTION OF THE RELATED ART

In the current development of the fast growing market of the personal electronic devices such as smartphones, laptops and desktop computers with lots of personal data contained therein, transferred thereby and associated therewith, the necessity occurs to guard and protect this personal data and keep it private.

One of the widely known solutions to do so is the authentication of a user of a device, and the voice authentication particularly. Since airways and soft tissue cavities with the shape and movement of the mouth and jaw influence the voice pattern, such a variety of different criteria allow distinguishing a unique voiceprint of a user. Voice authentication applies analysis of a user's voiceprint to verify their identity. The main approaches to authenticate the particular voiceprint can be divided into text-dependent approach and text-independent approach. In text-dependent approaches, the analyzed phrases are fixed and might be known beforehand. According to text-independent approaches, there are no constraints on the words which the user is allowed to use. Both of said approaches have their own pros and cons, however combination of such two approaches has been considered as the industrial standard. The voice interactions with our personal electronic devices commonly starts with sort of wake up word such as «Ok, Google», «Hi, Alexa» and «Hey, Siri» which is to indicate that the device shall be on the alert since command phrase will come in, and which consists of the fixed and preserved words. At the same time, the actual command phrase might not exactly be fixed and predetermined and will not be handled by the text-dependent approach. For instance, the command phrase can be as follows: «Show me pictures of my cat I have captured today» or «Transfer 10 bucks from my bank account to Alex for lunch».

For processing such interactions and recognizing the speaker, several solutions have been proposed. One of which is the Patent Application Publication No. US 2019/0043507 A1 «Method and system of robust speaker recognition activation» by Jonathan J. Huang and Tobias Bocklet (Intel Corporation, Feb. 7, 2019), where the authors propose utilizing both above mentioned approaches to accurately recognize the speaker. More particularly, the solution consists in performing text-dependent recognition on the wake up word and performing text-independent recognition on the command phrase or on both the wake up word and the command phrase. The results of the two approaches then fused to obtain the final score indicating that the particular user is speaking.

The other known solution is disclosed by the U.S. Pat. No. 10,255,922 «Speaker identification using a text-independent model and a text-dependent model» by Matthew Sharifi and Dominik Roblek (Google LLC, Apr. 9, 2019). The disclosed solution provides access to an access-controlled personal resource of the user without requiring the user to submit any further authentication information other than the single registration utterance by the user that includes the wake up word and the introduction declaration to the speech-enabled home device. In particular, the disclosed solution requires the single registration utterance by the user that includes the wake up word and the introduction declaration to register the user. By registration it is meant that a text-dependent speaker identification model is trained using the wake up word of the single registration utterance and a text-independent speaker identification model is trained using the introduction declaration of the single registration utterance. In response to the following request by the user, the system processes the wake up word by the trained text-dependent speaker identification model and processes the command phrase by the trained text-independent speaker identification model, and provides personalized response to the voice command of identified user.

Notwithstanding there are a number of protecting mechanisms and methods that serve to keep data from the outsiders with good intention, there are also those with hostility and who constantly develop their techniques for getting access to the personal data.

In particular, while voice authenticating of a user by a device the voice to be processed by the device can be substituted for instance by the sample of the voice of the actual user of the device in order to get unauthorized access to the data. Such voice sample can comprise for instance prerecorded utterance including a wake up word and a command phrase. In other instance, the whole utterance can be fully simulated by other computing device using unique features of the predefined voiceprint. In yet another instance both techniques can be implemented simultaneously. In each of such instances, the utterance shall be audibly presented closely to the device. The user authentication therefore can be spoofed by different techniques.

Despite the fact that the prior art provides solutions for so-called personalized access, they nevertheless do not provide adequate protection against unauthorized access attempts by attackers. That is the known solutions lack the sufficient spoofing protection.

Thus, new methods for spoofing proof authentication of the user by voice are needed.

SUMMARY OF THE INVENTION

To develop mechanisms for guarding the personal devices from the unauthorized access and increase the level of protectiveness of the data stored on the personal devices, a computer implemented methods and devices for spoofing proof authentication are proposed.

In one aspect of the invention, the computer implemented method for spoofing proof authentication comprises receiving a signal representing an utterance of a user including a wake up phrase part and a command phrase part; extracting, from the wake up phrase part of the signal, a first set of features and feeding said first set of features to a first pre-trained neural network and matching an obtained result from the first pre-trained neural network with a text-dependent model to assign a first matching score to the wake up phrase part of the signal; extracting, from the command phrase part of the signal, a second set of features and feeding said second set of features to a second pre-trained neural network and matching an obtained result from the second pre-trained neural network with a text-independent model to assign a second matching score to the command phrase part of the signal; computing a final matching score of the signal based on the first matching score and the second matching score; extracting, from the signal including the wake up phrase part and a command phrase part, features and feeding said features to at least one pre-trained neural network to assign at least one confidence score to the signal including the wake up phrase part and a command phrase part; computing an anti-spoofing confidence score based on the at least one confidence score; computing a final device authentication score, wherein the final device authentication score is weighted sum of a log-likelihood representation of the final matching score and a log-likelihood representation of the anti-spoofing confidence score; and comparing the final device authentication score with a predetermined authentication threshold.

According to one embodiment of the invention, computing the anti-spoofing confidence score comprises extracting, from the signal, a Fast Fourier Transform (FFT) feature and feeding said FFT feature to a first pre-trained deep neural network of the at least one pre-trained neural network to assign a first confidence score of the at least one confidence score to the signal; extracting, from the signal, a Discrete cosine transform (DCT) feature and feeding said DCT feature to a second pre-trained deep neural network of the at least one pre-trained neural network to assign a second confidence score of the at least one confidence score to the signal; applying a pre-trained deep convolutional network (DCN) of the at least one pre-trained neural network based on an end-to-end architecture to the speech signal to assign a third confidence score of the at least one confidence score to the signal; computing the anti-spoofing confidence score based on the first confidence score, the second confidence score and the third confidence score.

According to one embodiment of the invention, computing the anti-spoofing confidence score comprises extracting, from the signal, a first Fast Fourier Transform (FFT) feature or a first Discrete cosine transform (DCT) feature and feeding said features to a first pre-trained deep neural network of the at least one pre-trained neural network to assign a first confidence score of the at least one confidence score to the signal; comparing the assigned first confidence score to a predefined threshold to detect whether the received speech signal is spoofed; if the speech signal is detected as not spoofed, extracting, from the signal, a second Fast Fourier Transform (FFT) feature or a second Discrete cosine transform (DCT) feature and feeding said features to a second pre-trained deep neural network of the at least one pre-trained neural network to assign a second confidence score of the at least one confidence score to the signal; computing a first total confidence score based on the assigned first confidence score and the assigned second confidence score; comparing the computed first total confidence score to a predefined threshold to detect whether the received signal is spoofed; if the speech signal is detected as not spoofed, applying a pre-trained deep convolutional network (DCN) of the at least one pre-trained neural network based on an end-to-end architecture to the signal to assign a third confidence score of the at least one confidence score to the signal; computing the anti-spoofing confidence score based on the computed first total confidence score and the assigned third confidence score.

In a second aspect of the invention, the computer implemented method for spoofing proof authentication comprises receiving a signal representing an utterance of a user including a wake up phrase part and a command phrase part; extracting, from the wake up phrase part of the signal, a first set of features and feeding said first set of features to a first pre-trained neural network and matching an obtained result from the first pre-trained neural network with a text-dependent model to assign a first matching score to the wake up phrase part of the signal; extracting, from the command phrase part of the signal, a second set of features and feeding said second set of features to a second pre-trained neural network and matching an obtained result from the second pre-trained neural network with a text-independent model to assign a second matching score to the command phrase part of the signal; computing a final matching score of the signal based on the first matching score to the signal and the second matching score to the signal; extracting, from the signal including the wake up phrase part and a command phrase part, features and feeding said features to at least one pre-trained neural network to assign at least one confidence score to the signal including the wake up phrase part and a command phrase part; computing an anti-spoofing confidence score based on the at least one confidence score; computing a final device authentication score, wherein the final device authentication score is the final matching score, if the anti-spoofing confidence score is higher than a predetermined anti-spoofing threshold; and comparing the final device authentication score with a predetermined authentication threshold.

In a third aspect of the invention, the device for spoofing proof authentication comprises a signal receiver for receiving a signal representing an utterance of a user including a wake up phrase part and a command phrase part; a processor; and a memory storing instructions, which when executed by the processor cause the processor to: extract, from the wake up phrase part of the signal, a first set of features and feed said first set of features to a first pre-trained neural network and match an obtained result from the first pre-trained neural network with a text-dependent model to assign a first matching score to the wake up phrase part of the signal; extract, from the command phrase part of the signal, a second set of features and feed said second set of features to a second pre-trained neural network and match an obtained result from the second pre-trained neural network with a text-independent model to assign a second matching score to the command phrase part of the signal; compute a final matching score of the signal based on the first matching score and the second matching score; extract, from the signal including the wake up phrase part and a command phrase part, features and feed said features to at least one pre-trained neural network to assign at least one confidence score to the signal including the wake up phrase part and a command phrase part; compute an anti-spoofing confidence score based on the at least one confidence score; compute a final device authentication score, wherein the final device authentication score is weighted sum of a log-likelihood representation of the final matching score and a log-likelihood representation of the anti-spoofing confidence score; and compare the final device authentication score with a predetermined authentication threshold.

According to one embodiment of the invention, the signal receiver is a microphone integrated into the device converting an acoustic signal of the utterance into the signal representing the utterance.

According to yet another embodiment of the invention, the signal receiver is a communicating interface of the device receiving the signal representing the utterance directly or indirectly form a microphone.

In a fourth aspect of the invention, the device for spoofing proof authentication comprises a signal receiver for receiving a signal representing an utterance of a user including a wake up phrase part and a command phrase part; a processor; and a memory storing instructions, which when executed by the processor cause the processor to: receive a signal representing an utterance of a user including a wake up phrase part and a command phrase part; extract, from the wake up phrase part of the signal, a first set of features and feed said first set of features to a first pre-trained neural network and match an obtained result from the first pre-trained neural network with a text-dependent model to assign a first matching score to the wake up phrase part of the signal; extract, from the command phrase part of the signal, a second set of features and feed said second set of features to a second pre-trained neural network and matching an obtained result from the second pre-trained neural network with text-independent model to assign a second matching score to the command phrase part of the signal; compute a final matching score of the signal based on the first matching score and the second matching score; extract, from the signal including the wake up phrase part and a command phrase part, features and feed said features to at least one pre-trained neural network to assign at least one confidence score to the signal including the wake up phrase part and a command phrase part; compute an anti-spoofing confidence score based on the at least one confidence score; compute a final device authentication score, wherein the final device authentication score is the final matching score, if the anti-spoofing confidence score is higher than a pre-determined anti-spoofing threshold; and compare the final device authentication score with a predetermined authentication threshold.

BRIEF DESCRIPTION OF THE DRAWINGS

The invention described herein is illustrated by way of example and not by way of limitation in the accompanying drawings. For simplicity and clarity of illustration, elements illustrated in the drawings are not necessarily drawn to scale.

DETAILED DESCRIPTION

The present invention will now be described more fully with reference to the accompanying drawings, in which example embodiments of the present invention are illustrated. The subject matter of this disclosure may, however, be embodied in many different forms and should not be construed as being limited to the embodiments set forth herein.

The present invention is designed to authenticate a user of a personal device by the user's voice with anti-spoofing protection. The present invention is suitable for use in conjunction with voice assistants that are widely used in the modern smartphones, smart speakers and other smart devices with voice interfaces. The user can be a user of the particular personal device with which the user directly interacts, such as a smartphone, a wearable device or a laptop with a voice assistant installed thereon and without any further transmission of the signal. The present invention can be implemented for unlocking the personal device to access private data stored on the device or any other information using the voice assistant. Alternatively, the present invention can be implemented to access some services (such as banking service) through a user's device to, for example, make a transfer or to obtain data.

Figure 1:
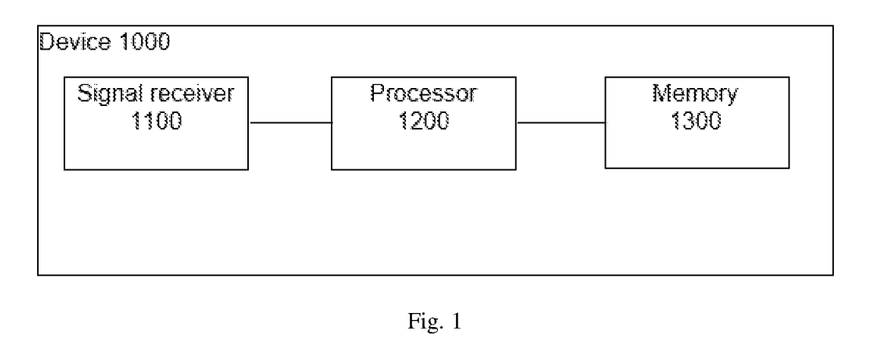
FIG. 1 shows a device for spoofing proof authentication according to a third aspect of the present invention.

FIG. 1 is a block diagram illustrating a device 1000 for spoofing proof authentication. According to various embodiments, said device can be a personal user device or a service authenticating device. In one embodiment, where the device 1000 is a personal user device, the authentication required to access the data of that device, for instance, to unlock the device or to request particular information stored in the device memory. In other embodiments, where the device 1000 is a service authenticating device, the device 1000 can be represented as a server of the service provider, which provides banking service, stores user's data, or operates with the user's data. In that particular case, the user reaches that device 1000 using his or her personal communicating device by means of Public Switched Telephone Network (including Cellar Network, Communication Satellites), VoIP or secured internet connection. According to this aspect, the device 1000 comprises a signal receiver 1100 for receiving a signal representing an utterance of the user. In one embodiment, the signal receiver 1100 can be a microphone integrated into the device converting an acoustic signal of the utterance into the signal representing the utterance. In that case, the signal rests in the user's device and is used for authentication on that device 1000. In another embodiment, the signal receiver 1100 can be a communicating interface of the device 1000 receiving the signal directly or indirectly from a microphone. In that case, the device 1000 represents the service provider device (such as server) or any other device that receives the signal representing the utterance, for instance, through PSTN, VoIP or a secured internet connection, as indicated above.

As indicated above with regard to the first and second aspects, the utterance of the user shall consist of two parts: a wake up phrase part and a command phrase part. The device 1000 also comprises a processor 1200 and a memory 1300 storing instructions, which when executed by the processor cause the processor to: extract, from the wake up phrase part of the signal, a first set of features and feed said first set of features to a pre-trained neural network and match an obtained result from the pre-trained neural network with a text-dependent model to assign a first matching score to the signal and extract, from the command phrase part of the signal, a second set of features and feed said second set of features to a pre-trained neural network and matching an obtained result from the pre-trained neural network with a text-independent model to assign a second matching score to the signal. By extracting the features from the signal, it is meant to apply one of the known approaches such as extracting Mel-frequency cepstral coefficients (MFCC) or creating Gaussian mixture model (GMM), or applying the Discrete Cosine Transform (DCT) or Fast Fourier Transform (FFT) to the signal. It is appreciated that before the authentication procedure the voiceprint of the voice of the user should have been created, for instance, by sampling the user's voice and extracting the set of features that shall be represented by one of said approaches selected. In both cases, creating the voiceprint and following authentication involve usage of a pre-trained neural network which analyses the signal. According to this embodiment, different pre-trained neural networks are used. Matching the obtained result from the pre-trained neural networks with the voiceprint assigns the first matching score to the wake up word phrase part and the second matching score to the command phrase part of the signal. Each of the first and second matching score is within the range from 0 to 1.

Further, said memory 1300 comprises instructions, which when executed by the processor 1200 cause the processor 1200 to compute a final matching score of the signal based on the first matching score and the second matching score. In one of the embodiments, said final matching score can be represented by a simple arithmetical mean. In other embodiments, the final matching score can be represented by the weighted sum of the first matching score and the second matching score, where the weight coefficients are chosen based on the special preferences such as lengths of the wake up word phrase part and the command phrase part, or language features. Therefore, the final matching score is within the range from 0 to 1.

Furthermore, the memory 1300 comprises instructions, which when executed by the processor 1200 cause the processor 1200 to compute an anti-spoofing confidence score for the signal including the wake up phrase part of the signal and the command phrase part of the signal. The anti-spoofing confidence score is within the range from 0 to 1. In a particular example, the anti-spoofing confidence is calculated by applying the following steps: extracting, from the signal, a Fast Fourier Transform (FFT) feature and feeding said FFT feature to a first pre-trained deep neural network of the at least one pre-trained neural network to assign a first confidence score of the at least one confidence score to the signal; extracting, from the signal, a Discrete cosine transform (DCT) feature and feeding said DCT feature to a second pre-trained deep neural network of the at least one pre-trained neural network to assign a second confidence score of the at least one confidence score to the signal; applying the pre-trained deep convolutional network (DCN) of the at least one pre-trained neural network based on an end-to-end architecture to the speech signal to assign a third confidence score of the at least one confidence score to the signal; computing the anti-spoofing confidence score based on the first confidence score, the second confidence score and the third confidence score.

Moreover, the memory 1300 comprises instructions, which when executed by the processor 1200 cause the processor 1200 to compute a final device authentication score, wherein the final device authentication score is a weighted sum of a log-likelihood representation of the final matching score and a log-likelihood representation of the anti-spoofing confidence score. In various embodiments, the weight coefficients can be chosen based on the various requirements. In some embodiments, the weight coefficients can be manually predetermined. In other embodiments, the weight coefficients can be retrieved based on some training data set. In a particular embodiment, the weight coefficient for the log-likelihood representation of the final matching score can be 0.4, and the weight coefficient for the log-likelihood representation of the anti-spoofing confidence score can be 0.6.

In addition to that, the memory 1300 comprises instructions, which when executed by the processor 1200 cause the processor 1200 to compare the final device authentication score with a predetermined authentication threshold. The predetermined threshold can be within the range between 0 and 1 or normalized to be in that range. In a particular embodiment, the predetermined threshold can be 0.95. Thus, if the calculated final device authentication score is less than the predetermined threshold, authentication of the user is not successful. In this embodiment, several unsuccessful authentications can be determined as unauthorized access attempts, and the user can be warned by various communication channels about said unauthorized access attempts. In case the calculated final device authentication score is more than the predetermined threshold, authentication of the user is successful.

The device 1000 is configured to perform a method 100 for spoofing proof authentication.

Figure 3:
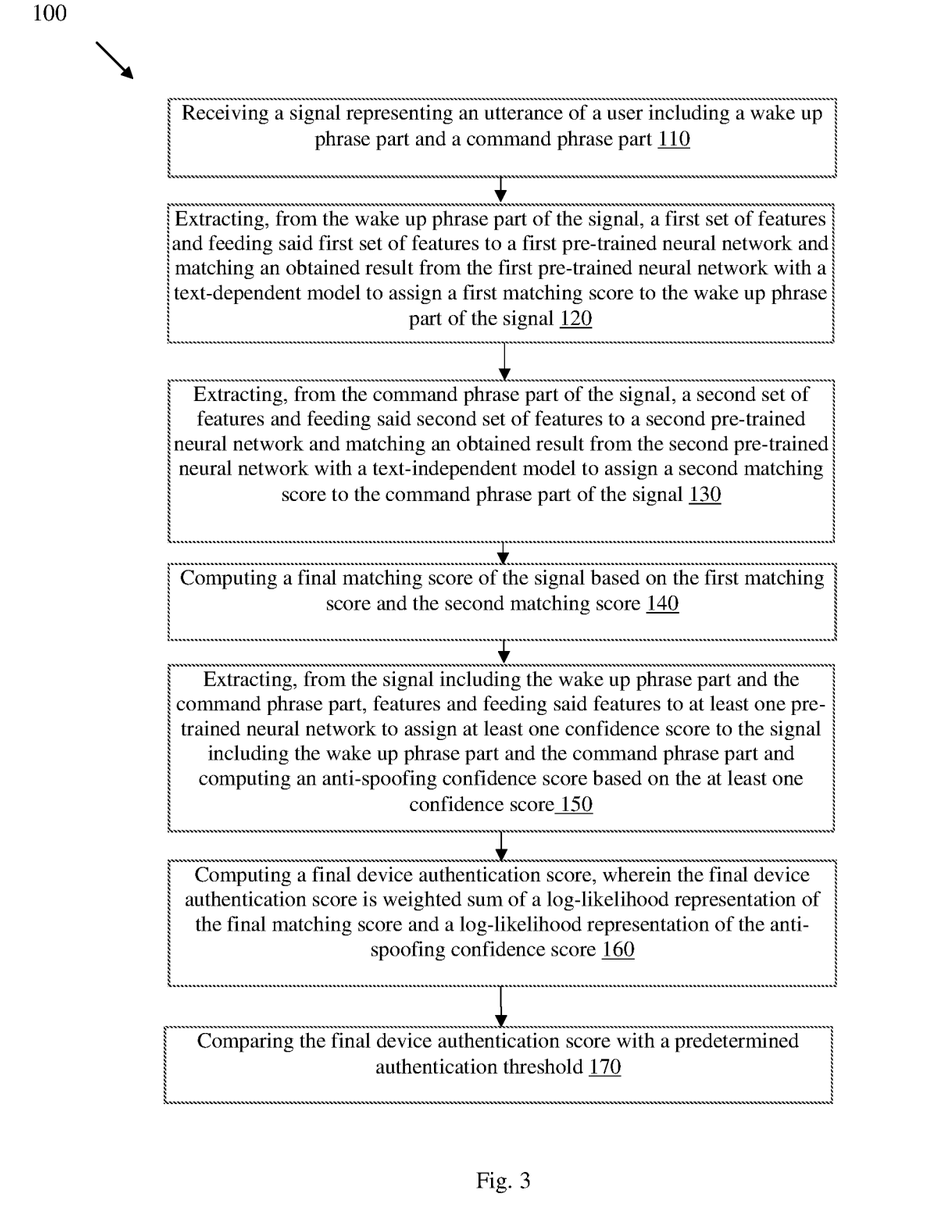
FIG. 3 shows a block diagram of a method for spoofing proof authentication according to a first aspect of the present invention.

In FIG. 3, a block diagram illustrates the main steps of the method 100 according to the proposed invention. The method 100 starts with the signal receiver 1100, through which step 110 of receiving a signal representing an utterance of a user including a wake up phrase part and a command phrase part is executed. At that step 110, the received signal shall be an electronic representation of the audible utterance of the user. The user can be the personal device user where the audible utterance is captured by the microphone of the personal device and transformed to the electronic signal. Alternatively, the user can be the bank service user, where the audible utterance captured by the microphone of the device which user uses is transformed to the electronic signal and then transferred by wireless means, for instance Public Switched Telephone Network (including Cellar Network, Communication Satellites) or VoIP, to the end point such as the bank call center. Alternatively, the user can be the user of any other service where the spoofing proof authentication might be needed. The utterance of the user shall consist of two parts: a wake up phrase part and a command phrase part. The wake up word phrase part can be one of the mentioned above wake up phrases such as «Ok, Google» or «Hey, Siri» as well as any other prescribed phrase. In particular, the wake up phrase does not have to be one prescribed by the service supplier (for instance, the bank service), but it can be prescribed by the user and used for communicating in a unique manner. The command phrase part shall comprise some command to be processed and that can concern personal data or access to services. In particular, the command phrase might request the bank service to make a transfer from the personal account of the user to another account or simply access the data stored in their own device.

The memory 1300 comprises instructions, which when executed by the processor 1200 cause the processor 1200 to perform steps 120-170. At step 120, by the processor 1200, a first set of features is extracted from the wake up phrase part of the signal and fed to a pre-trained neural network, and an obtained result from the pre-trained neural network is matched with a text-dependent model to assign a first matching score to the signal. The features extracted from the wake up phrase part can be represented as the Hidden Markov Model (MFCC) or Gaussian Mixture Model (GMM), but not limited by them, or a combination thereof. In one of the embodiments, the features can be a result of applying the Fast Fourier Transform (DCT). It is appreciated that before the authentication procedure the text-dependent model (voiceprint) of the voice of the user should have been created, for instance, by sampling the user's voice and extracting the set of features that shall be represented by one of said approaches selected for said text-dependent model. In both cases, creating the voiceprint and the following authentication involve usage of a pre-trained neural network which analyses the signal. Matching the obtained result from the pre-trained neural network with the voiceprint assigns the first matching score to the wake up word phrase part of the signal. The first matching score is within the range from 0 to 1.

At step 130, by the processor 1200, a second set of features is extracted from the command phrase part of the signal and fed to a pre-trained neural network, an obtained result from the pre-trained neural network is matched with a text-independent model to assign a second matching score to the signal. The features extracted from the command phrase part can be represented as the Mel-frequency cepstral coefficients (MFCC) or Gaussian mixture model (GMM), but not limited by them, or a combination thereof. In one of the embodiments, the features can be a result of applying the Discrete Cosine Transform (DCT). As indicated above, before the authentication procedure the text-independent model (voiceprint) of the voice of the user should have been created for instance by sampling the user's voice and extracting the set of features that shall be represented by one of said approaches selected for said text-independent model. In both cases, creating the voiceprint and following authentication involve usage of a pre-trained neural network which analyses the signal. Matching the obtained result from the pre-trained neural network with the voiceprint assigns the second matching score to the command phrase part of the signal. The second matching score is within the range from 0 to 1.

At step 140, by the processor 1200, a final matching score of the signal is calculated based on the first matching score and the second matching score. In one of the embodiments, said final matching score can be represented by a simple arithmetical mean. In other embodiments, the final matching score can be represented by the weighted sum of the first matching score and the second matching score, where the weight coefficients are chosen based on the special preferences such as lengths of the wake up word phrase part and the command phrase part, or language features. Therefore, the final matching score is within the range from 0 to 1.

At step 150, by the processor 1200, an anti-spoofing confidence score for the signal including the wake up phrase part and a command phrase part is calculated. In particular, the features are extracted from the signal including the wake up phrase part and the command phrase part, and said features are fed to at least one pre-trained neural network to assign at least one confidence score (step 150*a*, FIG. 5). Thus, the anti-spoofing confidence score for the signal including the wake up phrase part is calculated based on at least one confidence score (step 150*b*, FIG. 5). The anti-spoofing confidence score is within the range from 0 to 1. In a particular example, the anti-spoofing confidence is calculated by applying the following steps: extracting, from the signal, a Fast Fourier Transform (FFT) feature and feeding said FFT feature to a first pre-trained deep neural network of the at least one pre-trained neural network to assign a first confidence score of the at least one confidence score to the signal; extracting, from the signal, a Discrete cosine transform (DCT) feature and feeding said DCT feature to a second pre-trained deep neural network of the at least one pre-trained neural network to assign a second confidence score of the at least one confidence score to the signal; applying a pre-trained deep convolutional network (DCN) of the at least one pre-trained neural network based on an end-to-end architecture to the speech signal to assign a third confidence score of the at least one confidence score to the signal; computing the anti-spoofing confidence score based on the first confidence score, the second confidence score and the third confidence score.

At step 160, by the processor 1200, a final device authentication score is calculated. The final device authentication score is a weighted sum of a log-likelihood representation of the final matching score and a log-likelihood representation of the anti-spoofing confidence score. In different embodiments, the weight coefficients can be chosen based on the various requirements. In some embodiments, the weight coefficients can be manually predetermined. In one of the embodiments, the weight coefficients can be retrieved based on some training data set. In a particular embodiment, the weight coefficient for the log-likelihood representation of the final matching score can be 0.4, and the weight coefficient for the log-likelihood representation of the anti-spoofing confidence score can be 0.6.

Figure 5:
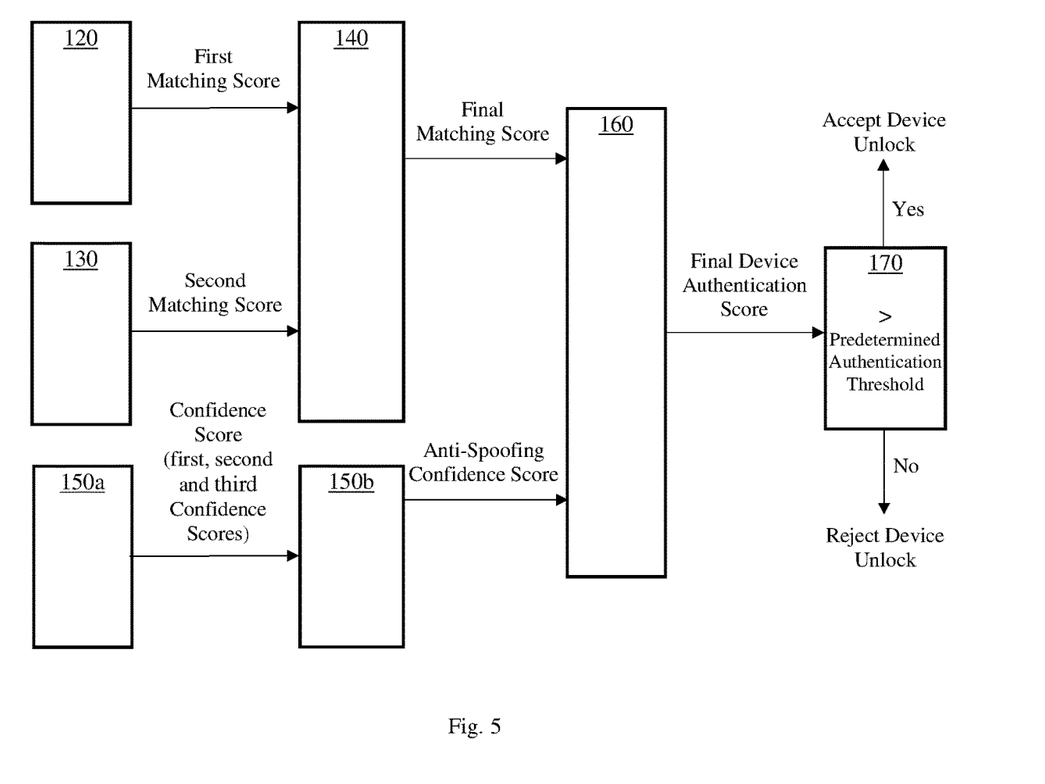
FIG. 5 shows a block scheme of a method for spoofing proof authentication according to a first aspect of the present invention.

At step 170, by the processor 1200, the final device authentication score is compared with a predetermined authentication threshold. The predetermined threshold can be within the range between 0 and 1 or normalized to be in that range. In a particular embodiment, the predetermined threshold can be 0.95. Thus, if the calculated final device authentication score is less than the predetermined threshold, authentication of the user is not successful. In this embodiment, several unsuccessful authentications can be determined as unauthorized access attempts, and the user can be warned by various communication channels about said unauthorized access attempts. In case the calculated final device authentication score is higher than the predetermined threshold, authentication of the user is successful (FIG. 5).

By implementing the claimed method, it is possible to provide access to data or services by the user voice without additional authentication. The service suppliers can provide secure access to their services with the technique of spoofing proof authentication. Implementation of the method provides not only personalized access to the data, but also provides the highest level of security due to anti-spoofing.

Figure 2:
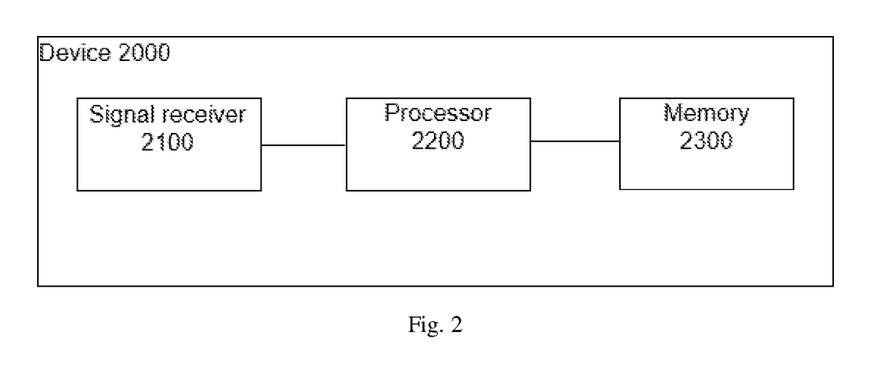
FIG. 2 shows a device for spoofing proof authentication according to a fourth aspect of the present invention.

According to another aspect of the proposed invention, a device 2000 for spoofing proof authentication is proposed, as shown on FIG. 2.

Alternatively to the device 1000, the device 2000 comprises a signal receiver 2100, a processor 2200 and a memory 2300. The signal receiver 2100 is required to receive a signal representing an utterance of a user. The memory 2300 comprises instructions, which when executed by the processor 2200 cause the processor 2200 to compute a final device authentication score, wherein the final device authentication score is the final matching score, if the anti-spoofing confidence score is higher than a predetermined anti-spoofing threshold. According to the aspect of the invention, in case the anti-spoofing confidence score is higher than a predetermined anti-spoofing threshold, the final device authentication score can be equal to the final matching score, and the anti-spoofing confidence score can be omitted from the final calculations. In a particular embodiment, the predetermined anti-spoofing threshold is 0.9. Thus, if the anti-spoofing confidence score is higher than 0.9, the final device authentication score equals to the final matching score. At the same time, in case the anti-spoofing confidence score is lower than 0.9, the authentication is considered to be not successful.

Further, the memory 2300 of the device 2000 comprises instructions, which when executed by the processor 2200 cause the processor 2200 to compare the final device authentication score with a predetermined authentication threshold. The predetermined threshold can be within the range between 0 and 1 or normalized to be in that range. In a particular embodiment, the predetermined threshold can be 0.95. Thus, if the calculated final device authentication score is less than the predetermined threshold, authentication of the user is not successful. In this embodiment, several unsuccessful authentications can be determined as unauthorized access attempts and the user can be warned by various communication channels about said unauthorized access attempts. In case the calculated final device authentication score is more than the predetermined threshold, authentication of the user is successful.

Figure 4:
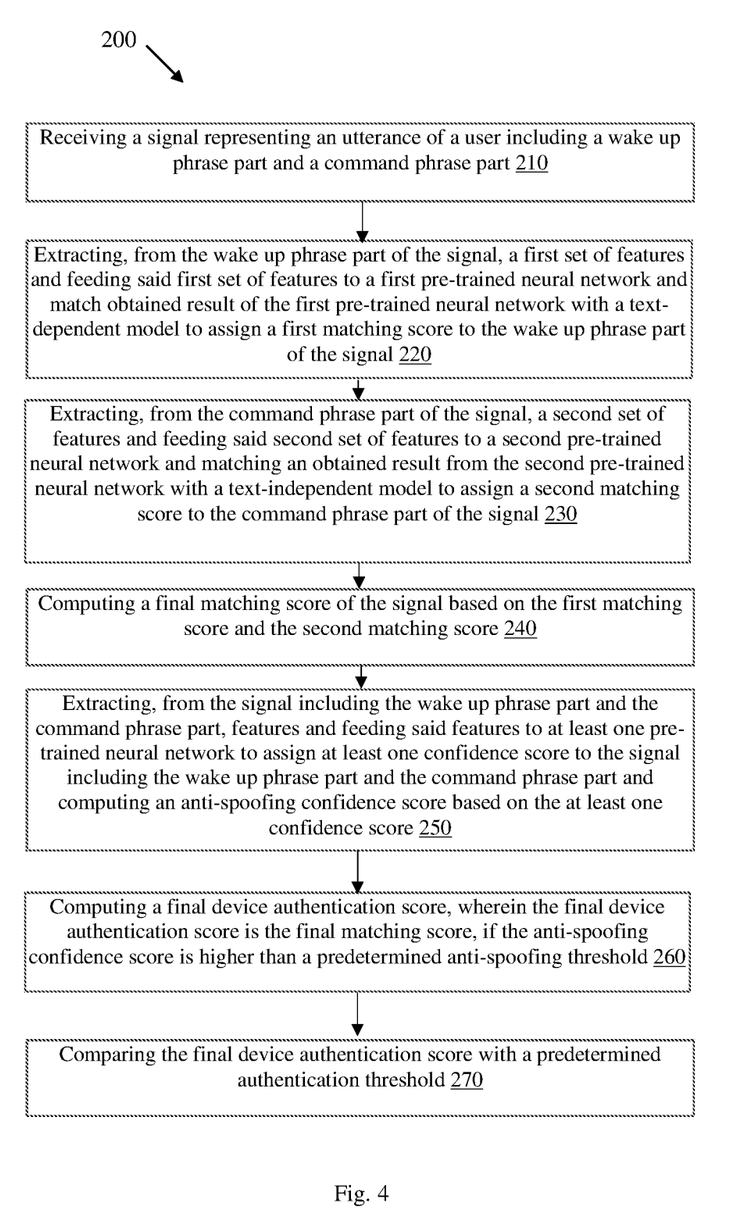
FIG. 4 shows a block diagram of a method for spoofing proof authentication according to a second aspect of the present invention.
Figure 6:
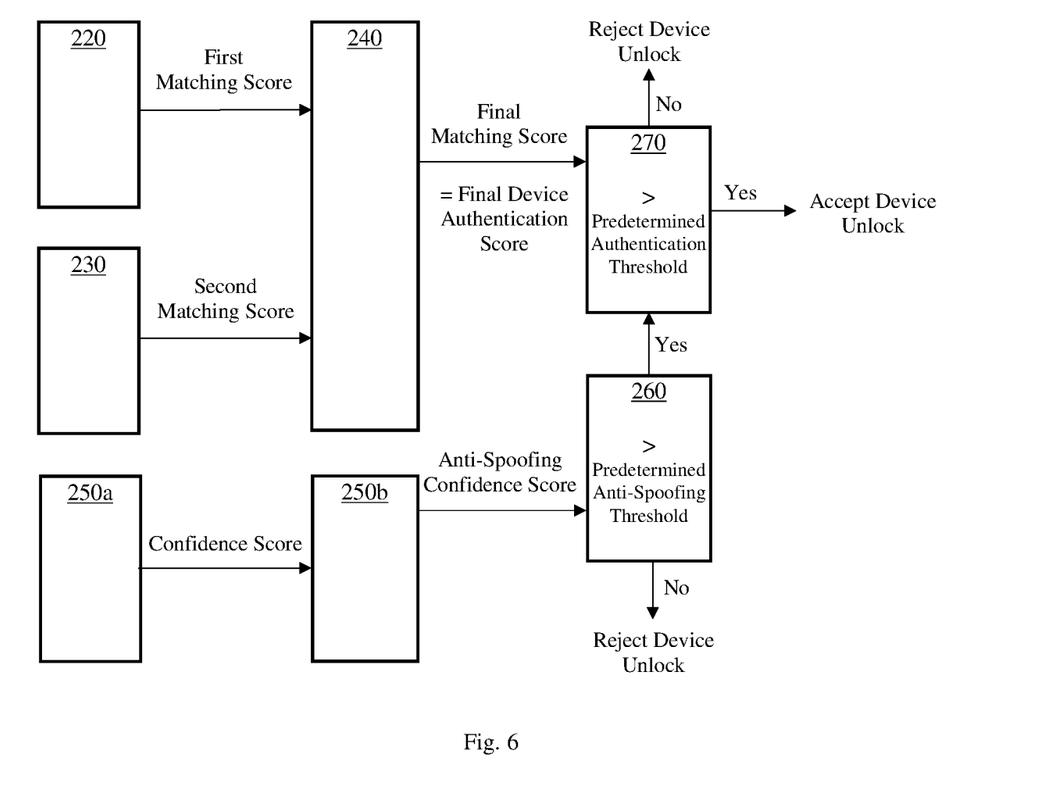
FIG. 6 shows a block scheme of a method for spoofing proof authentication according to a second aspect of the present invention.

The device 2000 is configured to perform a method 200 for spoofing proof authentication. According to the proposed invention, the main steps of the method 200 are shown in FIGS. 4, 6. As indicated with regard to the method 100 of the invention, the method 200 is also designed to authenticate the user of the personal device by the user's voice with anti-spoofing protection. The user can be the user of the particular personal device with which the user directly interacts such as a smartphone, a wearable device or a laptop without any further transmission of the communication. The method 200 can be implemented to unlock the personal device or accessing private data stored on the device. Alternatively, the method 100 can be implemented to access bank services through the user's device to, for example, make a transfer or obtain data.

The method 200 starts with the signal receiver 2100, through which the step 210 of receiving a signal representing an utterance of a user including a wake up phrase part and a command phrase part is executed.

The memory 2300 comprises instructions, which when executed by the processor 2200 cause the processor 2200 to perform steps 220-270. At that step 210 by the processor 2200, the received signal shall be an electronic representation of the audible utterance of the user. The user can be the personal device user where the audible utterance is captured by the microphone of the personal device and transformed to the electronic signal. Alternatively, the user can be the bank service user, where the audible utterance captured by the microphone of the device which user uses, is transformed to the electronic signal and then transferred by wireless means, for instance Public Switched Telephone Network (including Cellar Network, Communication Satellites), VoIP or secured internet connection, to the end point such as the bank call center. Alternatively, the user can be the user of any other service where the spoofing proof authentication might be needed.

The utterance of the user shall consist of two parts: a wake up phrase part and a command phrase part. The wake up word phrase part can be one of the mentioned above wake up phrases such as «Ok, Google» or «Hey, Siri» as well as any other prescribed phrase. In particular, the wake up phrase does not have to be one prescribed by the service supplier (for instance, the bank service), but it can be prescribed by the user and used for communicating in a unique manner. The command phrase part shall comprise some command to be processed that can concern personal data or access to services. In particular, the command phrase might request the bank service to make a transfer from the personal account of the user to another account or simply access the data stored in their own device.

At step 220, by the processor 2200, a first set of features is extracted from the wake up phrase part of the signal and fed to a pre-trained neural network, an obtained result from the pre-trained neural network is matched with a text-dependent model to assign a first matching score to the signal. The features extracted from the wake up phrase part can be represented as the Hidden Markov Model (MFCC) or Gaussian Mixture Model (GMM), but not limited by them, or a combination thereof. In one of the embodiments, the features can be a result of applying the Fast Fourier Transform (DCT). It is appreciated that before the authentication procedure the text-dependent model (voiceprint) of the voice of the user should have been created, for instance, by sampling the user's voice and extracting the set of features that shall be represented by one of said approaches selected for said text-dependent model. In both cases, creating the voiceprint and following authentication involve usage of a pre-trained neural network which analyses the signal. Matching the obtained result from the pre-trained neural network with the voiceprint assigns the first matching score to the wake up word phrase part of the signal. The first matching score is within the range from 0 to 1.

At step 230, by the processor 2200, a first set of features is extracted from the command phrase part of the signal and fed to a pre-trained neural network, an obtained result is matched from the pre-trained neural network with a text-independent model to assign a second matching score to the signal. The features extracted from the command phrase part can be represented as the Mel-frequency cepstral coefficients (MFCC) or Gaussian mixture model (GMM), but not limited by them, or a combination thereof. In one of the embodiments, the features can be a result of applying the Discrete Cosine Transform (DCT). As indicated above, before the authentication procedure the text-independent model (voiceprint) of the voice of the user should have been created, for instance, by sampling the user's voice and extracting the set of features that shall be represented by one of the said approaches selected for said text-independent model. In both cases, creating the voiceprint and following authentication involve usage of a pre-trained neural network which analyses the signal. Matching the obtained result from the pre-trained neural network with the voiceprint assigns the second matching score to the command phrase part of the signal. The second matching score is within the range from 0 to 1.

At step 240, by the processor 2200, a final matching score of the signal is calculated based on the first matching score and the second matching score. In one of the embodiments, said final matching score can be represented by a simple arithmetical mean. In other embodiments, the final matching score can be represented by the weighted sum of the first matching score and the second matching score, where the weight coefficients are chosen based on the special preferences such as lengths of the wake up word phrase part and the command phrase part, or language features. Therefore, the final matching score is within the range from 0 to 1.

At step 250, by the processor 2200, an anti-spoofing confidence score for the signal including the wake up phrase part and a command phrase part is calculated. In particular, the features are extracted from the signal including the wake up phrase part and the command phrase part, and said features are fed to at least one pre-trained neural network to assign at least one confidence score (step 250a, FIG. 6). Thus, the anti-spoofing confidence score for the signal including the wake up phrase part is calculated based on at least one confidence score (step 250b, FIG. 6). The anti-spoofing confidence score is within the range from 0 to 1. In a particular embodiment, the anti-spoofing confidence is calculated by applying the following steps: extracting, from the signal, a Fast Fourier Transform (FFT) feature and feeding said FFT feature to a first pre-trained deep neural network of the at least one pre-trained neural network to assign a first confidence score of the at least one confidence score to the signal; extracting, from the signal, a Discrete cosine transform (DCT) feature and feeding said DCT feature to a second pre-trained deep neural network of the at least one pre-trained neural network to assign a second confidence score of the at least one confidence score to the signal; applying the pre-trained deep convolutional network (DCN) of the at least one pre-trained neural network based on an end-to-end architecture to the speech signal to assign a third confidence score of the at least one confidence score to the signal; computing the anti-spoofing confidence score based on the first confidence score, the second confidence score and the third confidence score.

According to another embodiment of the invention, computing the anti-spoofing confidence score comprises extracting, from the signal, a first Fast Fourier Transform (FFT) feature or a first Discrete cosine transform (DCT) feature and feeding said features to a first pre-trained deep neural network of the at least one pre-trained neural network to assign a first confidence score of the at least one confidence score to the signal; comparing the assigned first confidence score to a predefined threshold to detect whether the received speech signal is spoofed; if the speech signal is detected as not spoofed, extracting, from the signal, a second Fast Fourier Transform (FFT) feature or a second Discrete cosine transform (DCT) feature and feeding said features to a second pre-trained deep neural network of the at least one pre-trained neural network to assign a second confidence score of the at least one confidence score to the signal; computing a first total confidence score based on the assigned first confidence score and the assigned second confidence score; comparing the computed first total confidence score to a predefined threshold to detect whether the received signal is spoofed; if the speech signal is detected as not spoofed, applying a pre-trained deep convolutional network (DCN) of the at least one pre-trained neural network based on an end-to-end architecture to the signal to assign a third confidence score of the at least one confidence score to the signal; computing the anti-spoofing confidence score based on the computed first total confidence score and the assigned third confidence score.

At step 260, by the processor 2200, a final device authentication score is calculated. The final device authentication score is the final matching score, if the anti-spoofing confidence score is higher than a predetermined anti-spoofing threshold. According to the aspect of the invention, in case the anti-spoofing confidence score is higher than a predetermined anti-spoofing threshold, the final device authentication score can be equal to the final matching score, and the anti-spoofing confidence score can be omitted from the final calculations. In a particular embodiment, the predetermined anti-spoofing threshold is 0.9. Thus, if the anti-spoofing confidence score is higher than 0.9, the final device authentication score equals to the final matching score. At the same time, in case the anti-spoofing confidence score is lower than 0.9, the authentication is considered to be not successful at that step (FIG. 6).

At step 270, by the processor 2200, the final device authentication score is compared with a predetermined authentication threshold. The predetermined threshold can be within the range between 0 and 1 or normalized to be in that range. In a particular embodiment, the predetermined threshold can be 0.95. Thus, if the calculated final device authentication score is less than the predetermined threshold, authentication of the user is not successful. In this embodiment, several unsuccessful authentications can be determined as unauthorized access attempts and the user can be warned by various communication channels about said unauthorized access attempts. In case the calculated final device authentication score is more than the predetermined threshold, authentication of the user is successful (FIG. 6).

Thus, the present invention applies text-dependent speaker recognition for wake up phrase part, applies text-independent speaker recognition for the command phrase part, voice anti spoofing technology for the whole utterance, combines the matching results and makes a final decision whether the speaker is allowed to unlock the device. The present invention allows to protect the user from the following spoofing attacks: impersonation, replay, speech synthesis, and voice conversion. Thus, it is possible to interact with the voice assistant installed in the personal device that contains a large amount of personal data, so that before this interaction the user does not have to enter a password manually or provide any biometrics to unlock the device. In particular, the user can, without being distracted by biometrics or entering a password, start interacting with the voice assistant, the device, in turn, will perform spoofing proof authentication in a passive mode, and after successfully passing it, the voice assistant will execute a command. Thus, the present invention can make it easier for the user to interact with the voice assistant. For example, this can be useful when the user is driving, preparing food, is in another room/in distance from the personal device or is restricted in movement.

It will be apparent to one of skill in the art that described herein is a novel system method and device for spoofing proof authentication. While the invention has been described with reference to specific preferred embodiments, it is not limited to these embodiments. The invention may be modified or varied in many ways and such modifications and variations, as would be obvious to one of skill in the art, are within the scope and spirit of the invention and are included within the scope of the following claims.

What is claimed is:

1. A computer implemented method for spoofing proof authentication, comprising:
receiving a signal representing an utterance of a user including a wake up phrase part and a command phrase part;
extracting, from the wake up phrase part of the signal, a first set of features and feeding said first set of features to a first pre-trained neural network and matching an obtained result from the first pre-trained neural network with a text-dependent model to assign a first matching score to the wake up phrase part of the signal;
extracting, from the command phrase part of the signal, a second set of features and feeding said second set of features to a second pre-trained neural network and matching an obtained result from the second pre-trained neural network with a text-independent model to assign a second matching score to the command phrase part of the signal;
computing a final matching score of the signal based on the first matching score and the second matching score;
extracting, from the signal including the wake up phrase part and the command phrase part, features and feeding said features to at least one pre-trained neural network to assign at least one confidence score to the signal including the wake up phrase part and the command phrase part;
computing an anti-spoofing confidence score based on the at least one confidence score;
computing a final device authentication score, wherein the final device authentication score is a weighted sum of a log-likelihood representation of the final matching score and a log-likelihood representation of the anti-spoofing confidence score; and
comparing the final device authentication score with a predetermined authentication threshold.

2. The method of claim 1, wherein computing the anti-spoofing confidence score comprises:

extracting, from the signal, a Fast Fourier Transform (FFT) feature and feeding said FFT feature to a first pre-trained deep neural network of the at least one pre-trained neural network to assign a first confidence score of the at least one confidence score to the signal;

extracting, from the signal, a Discrete cosine transform (DCT) feature and feeding said DCT feature to a second pre-trained deep neural network of the at least one pre-trained neural network to assign a second confidence score of the at least one confidence score to the signal;

applying a pre-trained deep convolutional network (DCN) of the at least one pre-trained neural network based on an end-to-end architecture to the signal to assign a third confidence score of the least one confidence score to the signal;

computing the anti-spoofing confidence score based on the first confidence score, the second confidence score and the third confidence score.

3. The method of claim 1, wherein computing the anti-spoofing confidence score comprises:

extracting, from the signal, a first Fast Fourier Transform (FFT) feature or a first Discrete cosine transform (DCT) feature and feeding said feature to a first pre-trained deep neural network of the at least one pre-trained neural network to assign a first confidence score of the at least one confidence score to the signal;

comparing the assigned first confidence score to a predefined threshold to detect whether the received signal is spoofed;

if the speech signal is detected as not spoofed, extracting, from the signal, a second Fast Fourier Transform (FFT) feature or a second Discrete cosine transform (DCT) feature and feeding said feature to a second pre-trained deep neural network of the at least one pre-trained neural network to assign a second confidence score of the at least one confidence score to the signal;

computing a first total confidence score based on the assigned first confidence score and the assigned second confidence score;

comparing the computed first total confidence score to a predefined threshold to detect whether the received signal is spoofed;

if the speech signal is detected as not spoofed, applying a pre-trained deep convolutional network (DCN) of the at least one pre-trained neural network based on an end-to-end architecture to the signal to assign a third confidence score of the at least one confidence score to the signal;

computing the anti-spoofing confidence score based on the computed first total confidence score and the assigned third confidence score.

4. A computer implemented method for spoofing proof authentication, comprising:

receiving a signal representing an utterance of a user including a wake up phrase part and a command phrase part;

extracting, from the wake up phrase part of the signal, a first set of features and feeding said first set of features to a first pre-trained neural network and matching an obtained result from the first pre-trained neural network with a text-dependent model to assign a first matching score to the wake up phrase part of the signal;

extracting, from the command phrase part of the signal, a second set of features and feeding said second set of features to a second pre-trained neural network and matching an obtained result from the second pre-trained neural network with a text-independent model to assign a second matching score to the command phrase part of the signal;

computing a final matching score of the signal based on the first matching score and the second matching score;

extracting, from the signal including the wake up phrase part and the command phrase part, features and feeding said features to at least one pre-trained neural network to assign at least one confidence score to the signal including the wake up phrase part and the command phrase part;

computing an anti-spoofing confidence score based on the at least one confidence score;

computing a final device authentication score, wherein the final device authentication score is the final matching score, if the anti-spoofing confidence score is higher than a predetermined anti-spoofing threshold; and comparing the final device authentication score with a predetermined authentication threshold.

5. The method of claim 4, wherein computing the anti-spoofing confidence score comprises:

extracting, from the signal, a Fast Fourier Transform (FFT) feature and feeding said FFT feature to a first pre-trained deep neural network of the at least one pre-trained neural network to assign a first confidence score of the at least one confidence score to the signal;

extracting, from the signal, a Discrete cosine transform (DCT) feature and feeding said DCT feature to a second pre-trained deep neural network of the at least one pre-trained neural network to assign a second confidence score of the at least one confidence score to the signal;

applying a pre-trained deep convolutional network (DCN) of the at least one pre-trained neural network based on an end-to-end architecture to the signal to assign a third confidence score of the at least one confidence score to the signal;

computing the anti-spoofing confidence score based on the first confidence score, the second confidence score and the third confidence score.

6. A device for spoofing proof authentication, comprising:

a signal receiver for receiving a signal representing an utterance of a user including a wake up phrase part and a command phrase part;

a processor; and a memory storing instructions, which, when executed by the processor, cause the processor to:

extract, from the wake up phrase part of the signal, a first set of features and feed said first set of features to a first pre-trained neural network and match an obtained result from the first pre-trained neural network with a text-dependent model to assign a first matching score to the wake up phrase part of the signal;

extract, from the command phrase part of the signal, a second set of features and feed said second set of features to a second pre-trained neural network and match an obtained result from the second pre-trained neural network with a text-independent model to assign a second matching score to the command phrase part of the signal;

compute a final matching score of the signal based on the first matching score and the second matching score;

extract, from the signal including the wake up phrase part and the command phrase part, features and feed said features to at least one pre-trained neural network to assign at least one confidence score to the signal including the wake up phrase part and the command phrase part;

compute an anti-spoofing confidence score based on the at least one confidence score;

compute a final device authentication score, wherein the final device authentication score is weighted sum of a log-likelihood representation of the final matching score and a log-likelihood representation of the anti-spoofing confidence score; and compare the final device authentication score with a predetermined authentication threshold.

7. The device of claim 6, wherein the signal receiver is a microphone integrated into the device converting an acoustic signal of the utterance of the user into the signal representing the utterance of the user.

8. The device of claim 6, wherein the signal receiver is a communicating interface of the device receiving the signal representing the utterance of the user directly or indirectly from a microphone.

9. A device for spoofing proof authentication, comprising:
a signal receiver for receiving a signal representing an utterance of a user including a wake up phrase part and a command phrase part;
a processor; and
a memory storing instructions, which when executed by the processor cause the processor to:
receive a signal representing an utterance of the user including the wake up phrase part and the command phrase part;
extract, from the wake up phrase part of the signal, a first set of features and feed said first set of features to a first pre-trained neural network and match an obtained result from the first pre-trained network with a text-dependent model to assign a first matching score to the wake up phrase part of the signal;
extract, from the command phrase part of the signal, a second set of features and feed said second set of features to a second pre-trained neural network and match an obtained result from the second pre-trained neural network with a text-independent model to assign a second matching score to the command phrase part of the signal;
compute a final matching score of the signal based on the first matching score and the second matching score;
extract, from the signal including the wake up phrase part and the command phrase part, features and feed said features to at least one pre-trained neural network to assign at least one confidence score to the signal including the wake up phrase part and the command phrase part;
compute an anti-spoofing confidence score based on the at least one confidence score;
compute a final device authentication score, wherein the final device authentication score is the final matching score, if the anti-spoofing confidence score is higher than a predetermined anti-spoofing threshold; and
compare the final device authentication score with a predetermined authentication threshold.

10. The device of claim 9, wherein the signal receiver is a microphone integrated into the device converting an acoustic signal of the utterance of the user into the signal representing the utterance of the user.

11. The device of claim 9, wherein the signal receiver is a communicating interface of the device receiving the signal representing the utterance of the user directly or indirectly from a microphone.

* * * * *